United States Patent [19]

Kawaguchi et al.

[11] Patent Number: 5,793,189
[45] Date of Patent: Aug. 11, 1998

[54] APPARATUS FOR PREVENTING OVER-DISCHARGE OF BATTERIES USED IN AN ELECTRIC VEHICLE

[75] Inventors: Kenji Kawaguchi; Masayuki Toriyama; Hiroshi Tanaka; Masahide Yokoo, all of Saitama, Japan

[73] Assignee: Honda Giken Kogyo Kabushiki Kaisha, Tokyo, Japan

[21] Appl. No.: 663,909

[22] Filed: Jun. 14, 1996

[30] Foreign Application Priority Data

Jun. 14, 1995 [JP] Japan ................................. 7-147861

[51] Int. Cl.$^6$ ................................................. H02J 7/14
[52] U.S. Cl. .................................... 322/28; 320/15
[58] Field of Search .......................... 322/28, 73; 320/15

[56] References Cited

U.S. PATENT DOCUMENTS

| 5,200,688 | 4/1993 | Patino et al. | 320/13 |
| 5,285,862 | 2/1994 | Furutani et al. | 180/65.4 |
| 5,334,926 | 8/1994 | Imaizumi | 320/15 |
| 5,350,994 | 9/1994 | Kinoshita et al. | 320/15 |
| 5,397,974 | 3/1995 | Tamai et al. | 320/13 |
| 5,504,414 | 4/1996 | Kinoshita | 320/15 |
| 5,600,215 | 2/1997 | Yamada et al. | 318/139 |

FOREIGN PATENT DOCUMENTS 60-003577  1/1985  Japan.
6-133401   5/1994  Japan.

*Primary Examiner*—Thomas M. Dougherty
*Assistant Examiner*—Nicholas Ponomarenko

[57] ABSTRACT

To provide an electric vehicle in which a low voltage power, obtained by conversion from a high voltage power of a main battery by a DC—DC convertor, is supplied to an operation control unit and electric equipment loads such as a lamp and is also used to charge a low voltage secondary battery, in which the main battery and the low voltage secondary battery are prevented from being over-discharged even when a main switch is left in the on-state. A low voltage power VR outputted from a DC—DC convertor is supplied to an exciting winding of a relay and is also supplied to a low voltage secondary battery through a diode. The low voltage power VR is supplied to low voltage loads through a contact of the relay. The DC—DC convertor is so constructed that the output of the low voltage power therefrom is stopped when the output voltage of the DC—DC convertor is reduced to a value less than a specified range due to the reduction in the battery capacity of the main battery. In the case where the battery capacity of the main battery is reduced when the main switch is left in the on-state, the output of the DC—DC convertor is stopped, and the contact of the relay is opened for preventing over-discharge of the low voltage secondary battery.

22 Claims, 5 Drawing Sheets

APPARATUS FOR PREVENTING OVER-DISCHARGE OF BATTERIES USED IN AN ELECTRIC VEHICLE

BACKGROUND OF THE INVENTION

1. Field of the Invention

The present invention relates to an electric vehicle including a high voltage chargeable main battery for supplying power to an electric motor; a step-down type DC—DC convertor; low voltage loads, such as an operation control unit and various electric equipment loads, each of which is operated at a low voltage; and a low voltage secondary battery for supplying power to the low voltage loads; wherein power of the main battery is supplied to the low voltage loads and is used for charging the low voltage secondary battery through the DC—DC convertor. In particular, the present invention concerns an apparatus for preventing over-discharge of batteries used for an electric vehicle, which prevents over-discharge of both the main battery and the low voltage secondary battery by stopping the operation of the DC—DC convertor under a specified condition and breaking the supply of power from the low voltage secondary battery to the low voltage loads.

2. Description of Background Art

Japanese Patent Laid-open No. Hei 6-133401 discloses an electric vehicle in which low voltage power for electrical equipment is obtained by conversion from a high voltage power of a main battery using a step-down type DC—DC convertor, and a secondary battery is provided on the low voltage output side of the DC—DC convertor.

FIG. 6 is a block diagram showing the configuration of an electric vehicle disclosed in Japanese Patent Laid-open No. Hei 6-133401. An electric vehicle 100 is constructed so that the DC power of a main battery 101 is converted into AC power by a controller 102 and supplied to a three-phase motor 103, and a rotational output of the motor 103 is transmitted to a driving rear wheel 105 through a transmission 104.

This electric vehicle 100 includes a DC—DC convertor 107 for supplying a low voltage power, for example, 12 V, to electric equipment loads 106 including a head lamp 106a, a horn 106b, and a tail/stop lamp 106c. A main switch 108 of the DC—DC convertor 107 includes an input side switch 108a and an output side switch 108b interlocked with each other. When the main switch 108 is turned on, power of the main battery 101 is supplied to the input side of the DC—DC convertor 107 through the input side switch 108a and a step-down DC power is supplied from the output side of the DC—DC convertor 107.

The step-down DC power thus obtained is supplied to the electric equipment loads 106 through the output side switch 108b and is also supplied to an exciting winding of a main relay 109 through a normally-closed contact of a relay 114 in a charger 111 for operating the main relay 109. Power of the main battery 101 is supplied to the controller 102 by operation of the main relay 109, and the controller 102 is activated so as to be in the operating state. The controller 102, which includes an invertor, controls the operation of the motor 103 on the basis of a throttle opening degree θTH.

The capacity of the DC—DC convertor 107 of the electric vehicle 100 is made small by provision of a low voltage secondary battery 110 on the output side of the DC—DC convertor 107. A current applied to the electric equipment loads 106 is temporarily increased when a lamp, buzzer and the like are operated simultaneously. At this time, insufficient power is supplied from the secondary battery 110 to drive these loads. The output capacity of the DC—DC convertor 107, however, is set to be larger than an average power consumption of the electric equipment loads 106 and to charge the secondary battery 110 in the state of such an average power consumption.

The electric vehicle 100 includes a charger 111. When a power source plug 112 of the charger 111 is plugged into a commercial power source receptacle, a DC power rectified in full-wave and controlled in current and voltage through a charge control means 113 is supplied to the main battery 101 to charge the main battery 101. In addition, the contact of the relay 114 provided in the charger 111 is opened in such a charging state to break the energization to the exciting winding of the main relay 109 so that the supply of power to the controller 102 is prevented even when the main switch 108 is in the on-state.

A problem exists in this related art vehicle when the main switch 108 is left in the on-state because the main battery 101 can be over-discharged or emptied. This problem occurs because the supply of power to the electric equipment loads 106 through the DC—DC convertor 107 is continued when the main switch 108 is left on.

An additional problem in the related art arises when the main battery's charge approaches an over-discharge state. Because the output voltage of the DC—DC convertor is reduced along with a reduction in the battery capacity of the main battery 101, the low voltage secondary battery 110 can be over-discharged due to the continued supply of power from the low voltage secondary battery 110 to the low voltage loads when the main switch 108 is left on.

In some cases, the service life of the main and secondary batteries is significantly reduced by over-discharge. Another problem caused by over-discharge is that the batteries may not be able to exhibit the original performance even after charging them again.

A technique of preventing over-discharge of a battery caused when a main switch is left in the on-state has been disclosed in Japanese Patent Laid-open Nos. Hei 6-197462 and Hei 5-205781, in which the voltage of a main battery is monitored and a switching element, interposed between the main battery and a load, is controlled to break the supply of power from the main battery to the load when the voltage of the main battery is reduced below a predetermined threshold voltage.

The over-discharge preventive circuit for the secondary battery as proposed in Japanese Patent Laid-open No. Hei 6-197462 monitors the voltage of the secondary battery using a zener diode and controls the supply/breaking of power by an electronic switching element that uses a transistor. This circuit is also intended to regulate the supply/breaking of power by setting a breaking voltage of the power source to be lower than power supply starting voltage of the power source.

The over-discharge preventive apparatus proposed in Japanese Patent Laid-open No. Hei 5-205781 detects a discharge current of a battery and changes a threshold voltage for over-discharge of the battery on the basis of the detected discharge current. A terminal voltage of the secondary battery is significantly changed depending on a discharge current. When a load applied to an electric vehicle is large, for example upon quick starting or ascending along a slope, a discharge current becomes large and thereby the terminal voltage of the secondary battery is lowered. For this reason, this apparatus is intended to effectively use the capacity of the secondary battery and to prevent over-discharge by changing a threshold voltage for over-discharge depending on a discharge current.

A technique of preventing over-discharge of a battery when a driver is not inside an electric car, is disclosed in Japanese Utility-model Laid-open No. Sho 63-21401 and Japanese Patent Laid-open No. Hei 4-145811.

An apparatus for preventing a power source switch from being left in the on-state in a battery type vehicle, proposed in Japanese Utility-model Laid-open No. Sho 63-21401, includes a means for detecting whether or not a driver is inside the vehicle. A power source breaking switch is controlled so as to be turned off after an elapse of a specified time after the driver leaves the vehicle.

A driving apparatus for an electric car driven by vector control of a motor, proposed in Japanese Patent Laid-open No. Hei 4-145811, is intended to prevent over-discharge of a battery even when a driver is out of the vehicle with a shift lever left in a D range by setting an exciting current command value of the motor at zero when the absence of the driver is detected.

There are disadvantages in the above described over-discharge preventive apparatus of the related art. The switching element for breaking the supply of power between the relatively high voltage main battery and the load requires a high withstand voltage. Another disadvantage is that because the apparatus is so constructed as to monitor a voltage of a main battery having a terminal voltage that varies widely in operation, it requires a special circuit configuration in which, for example, a hysteresis characteristic is provided between an energization enabling voltage and a breaking voltage or requires a threshold voltage to be changed depending on an amount of a discharge current. Thus, the conventional circuit configuration is complicated and requires a high withstand voltage switch.

The above configuration of stopping the supply of an unnecessary power when the absence of a driver is confirmed, described in the related art, requires a means for detecting whether or not the driver is in the vehicle, thus complicating the apparatus.

SUMMARY AND OBJECTS OF THE INVENTION

The present invention has been made to solve the above-described problems.

An object of the present invention is to provide an apparatus for preventing over-discharge of batteries used in an electric vehicle which is capable of simplifying a circuit configuration by detecting a reduction in a battery capacity of a main battery using an output voltage regulating function of a DC—DC convertor without provision of a special circuit for detecting the reduction in the battery capacity of the main battery; and which is capable of preventing over-discharge of the main battery and a low voltage secondary battery using a switching element having a low withstand voltage.

To achieve the above object, according to a preferred mode of the present invention, there is provided an apparatus for preventing over-discharge of batteries used in an electric vehicle, including a high voltage main battery having sub-batteries and a secondary battery. A DC—DC convertor receives power from the main battery and outputs a low voltage power and is adapted to stop the output of the low voltage power when the output voltage of the low voltage power cannot be kept within a specified voltage range. A low voltage load is driven by the low voltage power outputted from the DC—DC convertor. A low voltage secondary battery is charged by the output voltage from the DC—DC convertor and supplies power to the low voltage load. A circuit breaking element is provided for breaking the supply of power from the low voltage secondary battery to the low voltage load on the basis of stopping of the output of the low voltage power from the DC—DC convertor.

The circuit breaking element in the above apparatus preferably includes a relay having an exciting winding which is supplied with the output voltage from the DC—DC convertor and has a normally-open contact through which the supply of power to the low voltage load is controlled.

According to the apparatus of the present invention, when the supply of power to a DC—DC convertor is reduced, corresponding to a reduction in battery capacity of a main battery, the output of low voltage power from the DC—DC convertor is stopped. A circuit breaking element breaks the supply of power from a low voltage secondary battery to low voltage loads on the basis of the stopping of the output of the low voltage power from the DC—DC convertor, to thereby prevent over-discharge of the low voltage secondary battery. Because power consumption of the DC—DC convertor is reduced by the stopping of the output of the low voltage power from the DC—DC convertor, the power consumption of the main battery is reduced, thus preventing over-discharge of the main battery.

In the above apparatus, the circuit breaking element may include a relay, driven by the output voltage of a DC—DC convertor, which controls the supply of power to low voltage loads through a normally-open contact of the relay. According to the invention, it is possible to simplify the configuration of the circuit breaking element in comparison to the related art.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative o f the present invention, and wherein.

DETAILED DESCRIPTION OF THE PREFERRED EMBODIMENTS

Hereinafter, embodiments of the present invention will be described with reference to the drawings.

Figure 1:
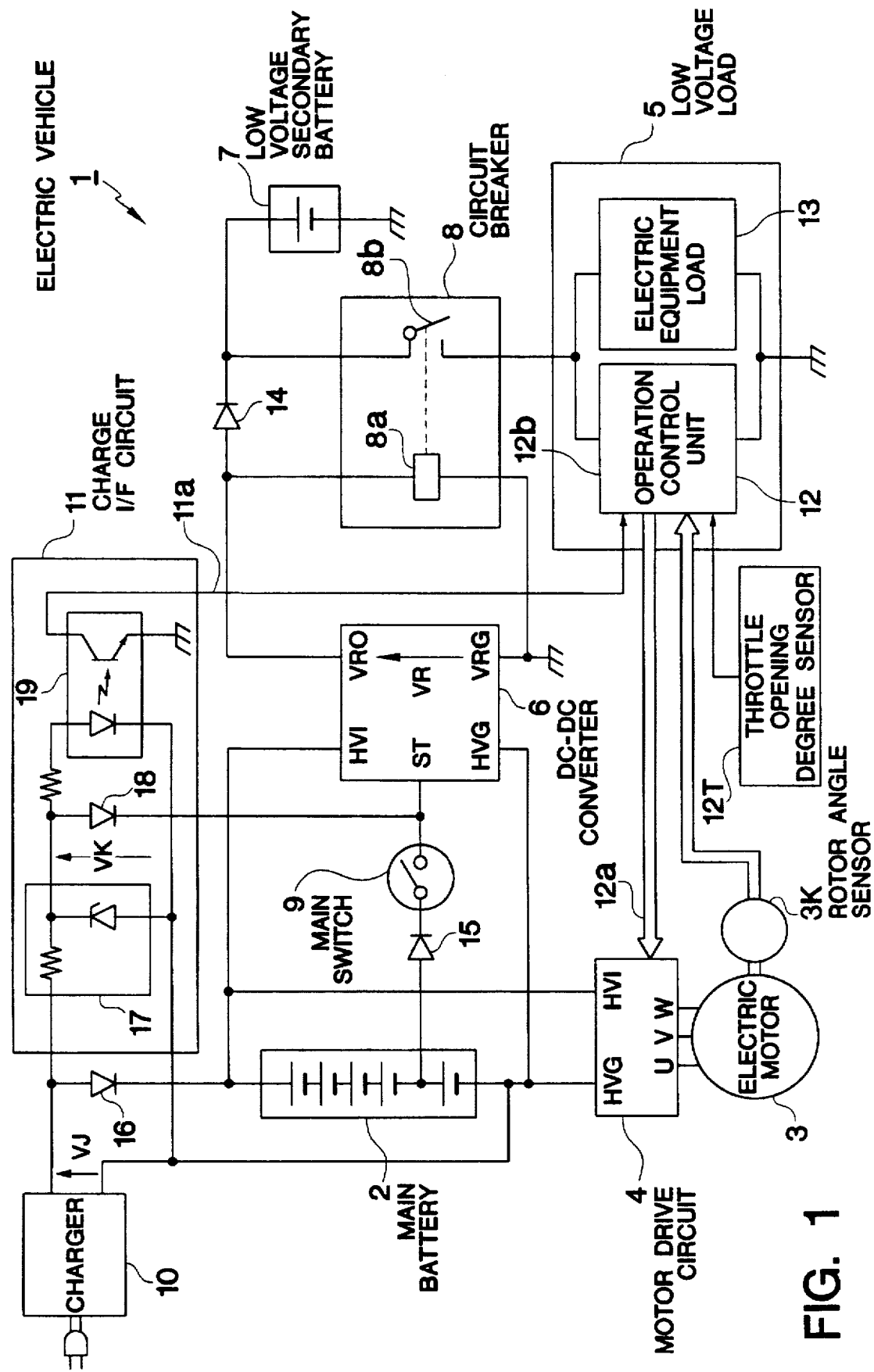
FIG. 1 is a block diagram showing an electric system of an electric vehicle including a battery over-discharge preventive apparatus of the present invention.

FIG. 1 is a block diagram showing an electric system of an electric vehicle including an apparatus for preventing over-discharge of a battery according to the present invention.

An electric system 1 of an electric vehicle includes:

a main battery 2; a motor drive circuit 4 for supplying an AC power to each winding of an electric motor 3; a DC—DC convertor 6 for receiving power from the main battery 2 and supplying low voltage power VR to low voltage loads 5; a low voltage secondary battery 7; a circuit breaking element 8 for breaking the supply of power to the low voltage loads 5; a main switch 9; a charger 10; and a charge interface circuit (charge I/F circuit) 11. The low voltage loads 5 include an operation control unit 12 and electric equipment loads 13.

The main battery 2 includes a plurality of sub-batteries each having a specified rated output voltage which are connected in series for supplying a high DC voltage. For example, the main battery 10 may include five sub-batteries each having a rated output voltage of 12 V connected in series to output 60 V.

A three-phase brushless servo-motor is preferably used as the electric motor 3. The motor drive circuit 4 includes an invertor for converting DC power supplied from the main battery 2 into AC power and supplying the AC power to the electric motor 3. The motor drive circuit 4 switches a plurality of switching elements constituting the invertor on the basis of a switching command signal 12a supplied from the operation control unit 12, to supply power to each winding of the electric motor 3 for rotating the electric motor 3. In addition, the low voltage power VR is dependent from the main battery 2 in this embodiment, the switching command signal 12a outputted from the operation control unit 12 is transmitted to the motor drive circuit 4 side through a power separating type signal transmission circuit, not shown, such as a photocoupler.

A switching regulator of an input-output isolating type is preferably used as the DC—DC convertor 6. The DC—DC convertor 6 starts DC—DC conversion when a specified voltage is supplied to a starting control input terminal ST. In FIG. 1, reference characters HVI and HVG indicate input terminals of a high voltage power side, and VRO and VRG indicate output terminals of a low voltage VR power side.

Figure 2:
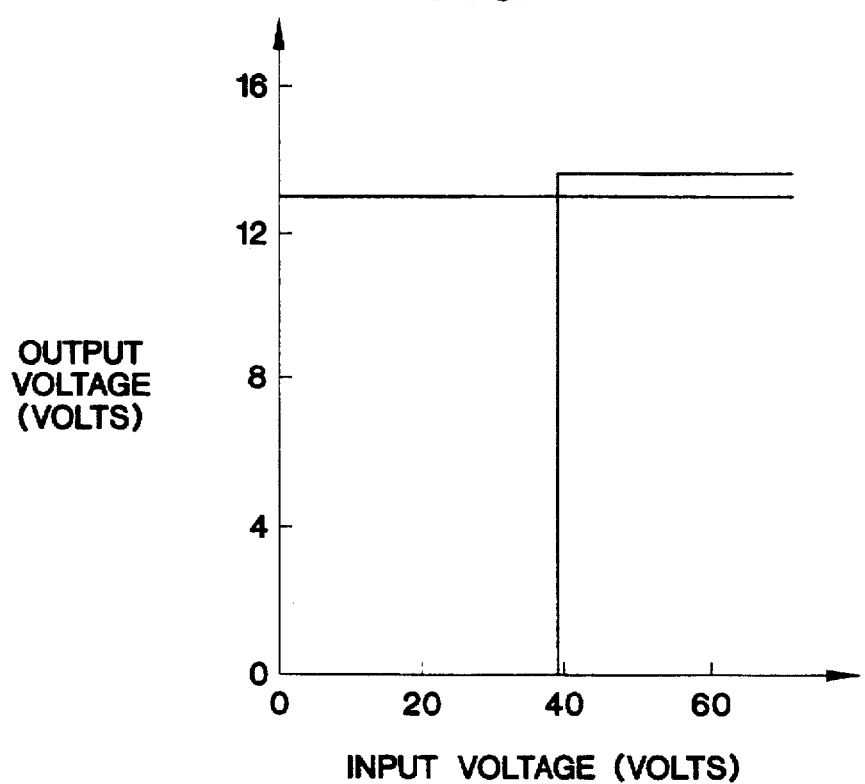
FIG. 2 is a graph showing one example of an input-output characteristic of a DC—DC convertor.

FIG. 2 is a graph showing one example of an input/output characteristic of the DC—DC convertor. The DC—DC convertor 6 is intended to regulate an output voltage by monitoring the output voltage of the low voltage power VR and to control the switching condition on the high voltage side so that the output voltage is not excessively large or insufficient. Accordingly, even when the output voltage of the main battery 2 (input voltage of the DC—DC convertor) is reduced, for example, from 60 V to about 40 V, the output voltage of the low voltage power VR is regulated, for example, at 13.5 V.

The DC—DC convertor 6 is so constructed that when the output voltage of the main battery 2 (input voltage of the DC—DC convertor) is reduced, for example, to 40 V or less, the output of the low voltage power VR is stopped. The maximum output voltage VR of the DC—DC convertor 6 is set to be slightly larger than an average power consumption of the low voltage load 5.

The low voltage secondary battery 7 has a capacity smaller than that of one of the sub-batteries constituting the main battery 2. For example, the low voltage secondary battery 7 can have a capacity of about 1/10 of the battery capacity of the main battery.

The low voltage secondary battery 7 is charged by receiving the output voltage of the DC—DC convertor 6 through a counterflow preventive diode 14. It is to be noted that the counterflow preventive diode 14 may be provided in the DC—DC convertor 6.

Power is supplied from the cathode side of the counterflow preventive diode 14 to the low voltage loads 5 through the circuit breaking element 8. When the power consumption of the low voltage load 5 becomes temporarily large to such an extent as to exceed the maximum output power of the DC—DC convertor 6, the power deficiency is supplied from the low voltage secondary battery 7 to the low voltage loads 5.

The circuit breaking element 8 may include a relay as shown in FIG. 1. The low voltage power VR outputted from the DC—DC convertor 6 is applied to an exciting winding 8a of the relay, and the supply/breaking of power to the low voltage load 5 is performed through a normally-open contact 8b of the relay.

The main switch 9 includes a key operated switch or the like. When the main switch 9 is turned on, a voltage, for example, 12 V, equivalent to that of one of the sub-batteries of the main battery 2 is supplied to the starting control input terminal ST of the DC—DC convertor 6 through the counterflow preventive diode 15. The DC—DC convertor 6 is operated to output the low voltage power VR when a specified voltage, for example, 12 V, is thus supplied to the starting control input terminal ST. The low voltage power VR is thus supplied to the operation control unit 12 as one of the low voltage loads 5 through the counterflow preventive diode 14 and the contact 8b of the relay in the circuit breaking element 8, so that the electric vehicle 1 is turned on to the operable state.

A switch having a low withstand voltage can be used in this embodiment because a relatively low voltage from a sub-battery of the main battery 2 is supplied to the starting control input terminal ST of the DC—DC converter 6 through a main switch 9 for starting the DC—DC converter 6.

The charger 10 outputs a charging DC power VJ by voltage transformation and rectification of a commercial power source. The charging DC power VJ is supplied to the main battery 2 through a main battery charging diode 16. The charger 10 includes the function of controlling the output voltage and the output current. The charger 10 charges the main battery 2 and also prevents over-charge of the main battery 2 by checking the charging state of the main battery 2 through monitoring the output current and controlling the output voltage and output current on the basis of the charging state.

The charge interface (I/F) circuit 11 includes a simplified constant voltage circuit 17, an on-charge DC—DC convertor starting circuit 18, and a charging state information transmitting circuit 19. The simplified constant voltage circuit 17 outputs a DC voltage VK required for starting the DC—DC convertor 6.

The on-charge DC—DC convertor starting circuit 18 is composed of a counterflow preventive diode. The starting DC voltage VK is supplied to the starting control input terminal ST of the DC—DC convertor 6 through the oncharge DC—DC convertor starting circuit, counterflow preventive diode. This allows the DC—DC convertor 6 to be started even when the main switch 9 is in the off-state, to thereby charge the low voltage secondary battery 7 by the output from the DC—DC convertor 6.

The charging state information transmitting circuit 19 is composed of a power separating type signal transmitting circuit such as a photocoupler. In this embodiment, current flows in the photodiode on the basis of the output voltage VK from the simplified constant voltage circuit 17, to turn on a phototransistor, thereby controlling a charging state information input terminal 12b of the operation control unit 12 at an L level. When the charging state information input terminal 12b becomes the L level (indicative that the electric vehicle is being charged), the operation control unit 12 stops the operation of the electric vehicle 1 by stopping the operation control.

The operation control unit 12 in a normal operating state checks the mechanical rotational position of a rotor of the electric motor 3 on the basis of the output from a rotor angle sensor 3K, to determine an energizing timing to each winding of the electric motor 3; and further to produce and output the switching command signal 12a that is subjected to pulse width modulation (PWM) in accordance with a throttle opening degree detected by a throttle opening degree sensor 12T, to thereby adjust the output from the electric motor 3.

Figure 3:
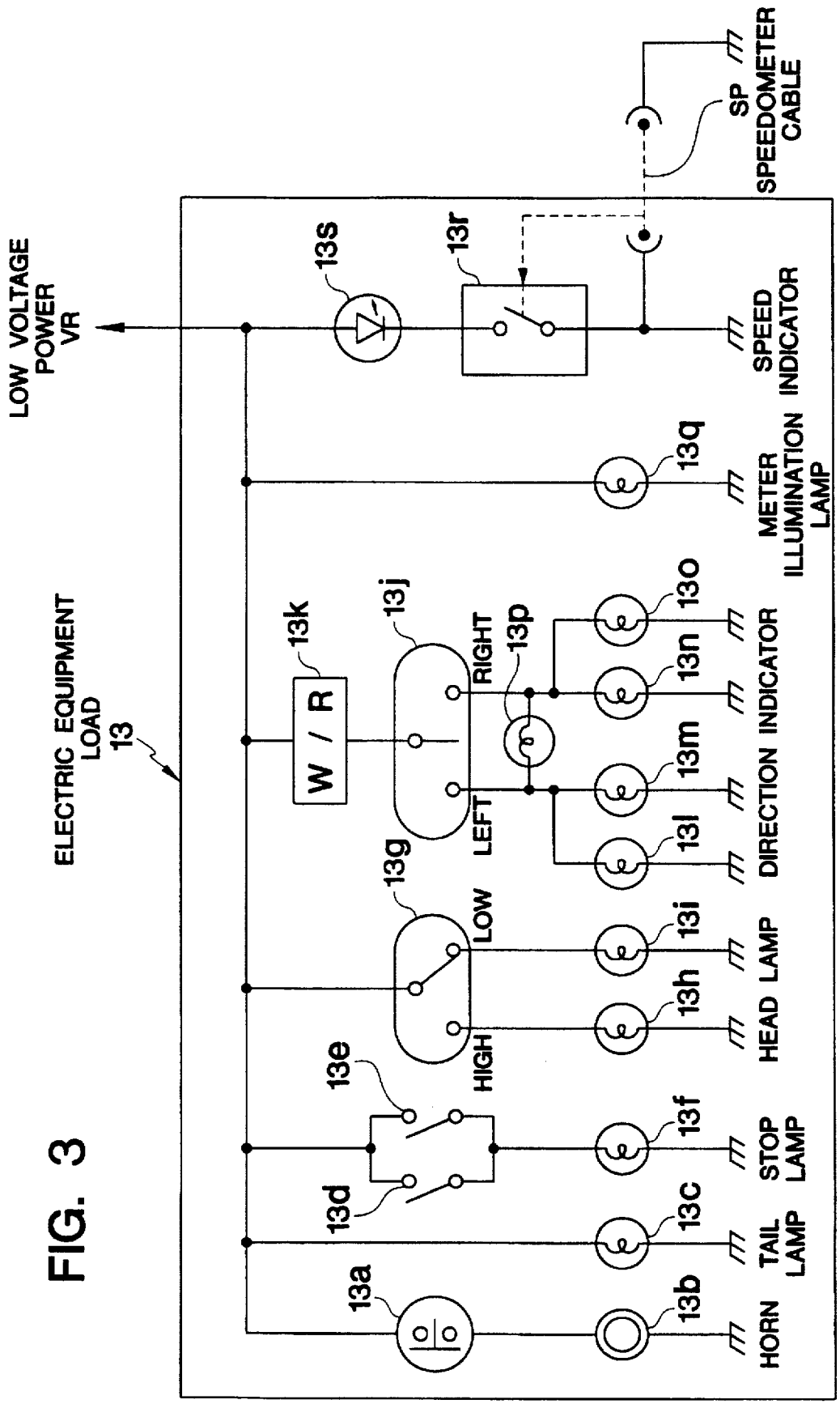
FIG. 3 is a circuit diagram showing examples of electric equipment loads.

FIG. 3 is a circuit diagram showing examples of electric equipment loads. Examples of the electric equipment loads include a horn 13b operated by a horn switch 13a; a tail lamp 13c; a stop lamp 13f connected in series to switches 13d, 13e closed in accordance with braking operation; a high beam head lamp 13h and a low beam head lamp 13i illuminated through a beam switch 13g; direction indicator lamps 13l to 13p flashed by a direction indicator timer 13k on the basis of the operation of a direction indicator switch 13j; a meter illuminating lamp 13q; and a light emitting diode 13s for indicating an over-speed, which is illuminated through a switch 13r closed when a vehicular speed detected through a speed meter cable SP is more than a specified value. The tail lamp 13c, either of the head lamp 13h and 13i, and the meter illuminating lamp 13q are usually illuminated when the main switch 2 is operated to output the low voltage power VR and the low voltage power VR thus outputted is supplied through the circuit breaking element 8 to the electric equipment loads 13.

When the direction indicator switch 13j is switched from the neutral position to the right side, the direction indicator lamps 13n and 13o on the right side flash and also the indicator lamp 13p for indicating the direction indicator operation is flashed. In this case, current is also supplied to the direction indicator lamps 13l and 13m on the left side through the indicator lamp 13p. However, the direction indicator lamps 13l and 13m are not illuminated because the indicator lamp 13p is small in power consumption, for example, 3.4 watt, and high in resistance and thereby the voltage generated across each of the direction indicator lamps 13l and 13m, each power consumption: 10 watt, on the left side is low. Similarly, when the direction indicator switch 13j is switched on the left side, the direction indicator lamps 13l and 13m, and the indicator lamp 13p on the left side are flashed, while the direction indicator lamps 13n and 13p on the right side are not illuminated.

Next, the operation of the electric vehicle shown in FIG. 1 will be described. When the main switch 9 is turned on, a starting power, for example, a voltage equivalent to that of one of the sub-batteries within the main battery 2, is supplied to the starting control input terminal ST of the DC—DC convertor 6, so that the DC—DC convertor 6 is operated to output the low voltage power VR.

The low voltage power VR is supplied to the exciting winding 8a of the relay within the circuit breaking element 8 and the normally-open contact 8b of the relay is closed. The low voltage power VR is thus supplied to the operation control unit 12 and the electric equipment loads 13, thus putting the electric vehicle in the operable state.

When the main switch 9 is left in the on-state, the battery capacity of the main battery 2 is reduced because the supply of power to the low voltage loads 5, operation control unit 12 and electric equipment loads 13, through the DC—DC convertor 6 is continued. As a result, a voltage supplied to the primary side, terminal HVI and HVG, of the DC—DC convertor 6 is reduced.

When the voltage supplied to the primary side is reduced, for example, to 40 V or less, the DC—DC convertor 6 stops the output of the low voltage power VR. The normally-open contact 8b of the relay constituting the circuit breaking element 8 is thus placed in the open state, to thereby stop the supply of power from the low voltage secondary battery 7 to the low voltage load 5. Stopping the output of the low voltage power VR reduces the power consumption of the primary side of the DC—DC convertor 6, that is, the supply of power from the main battery 2.

When the electric vehicle is left in a state where, for example, the lamps are illuminated, there is a fear that the main battery 2 can be over-discharged because a large power is continuously supplied from the main battery 2 through the DC—DC convertor 6 to the electric equipment load 5. In this embodiment, however, when a voltage supplied to the primary side of the DC—DC convertor 6 is reduced to a specified value (which corresponds to a reduction in the battery capacity of the main battery 2) the DC—DC convertor 6 stops the output of the low voltage power VR, thus preventing the main battery 2 from being over-discharged. Further, over-discharge of the low voltage secondary battery 7 is prevented by operation of the circuit breaking element 8 as described above.

Figure 4:
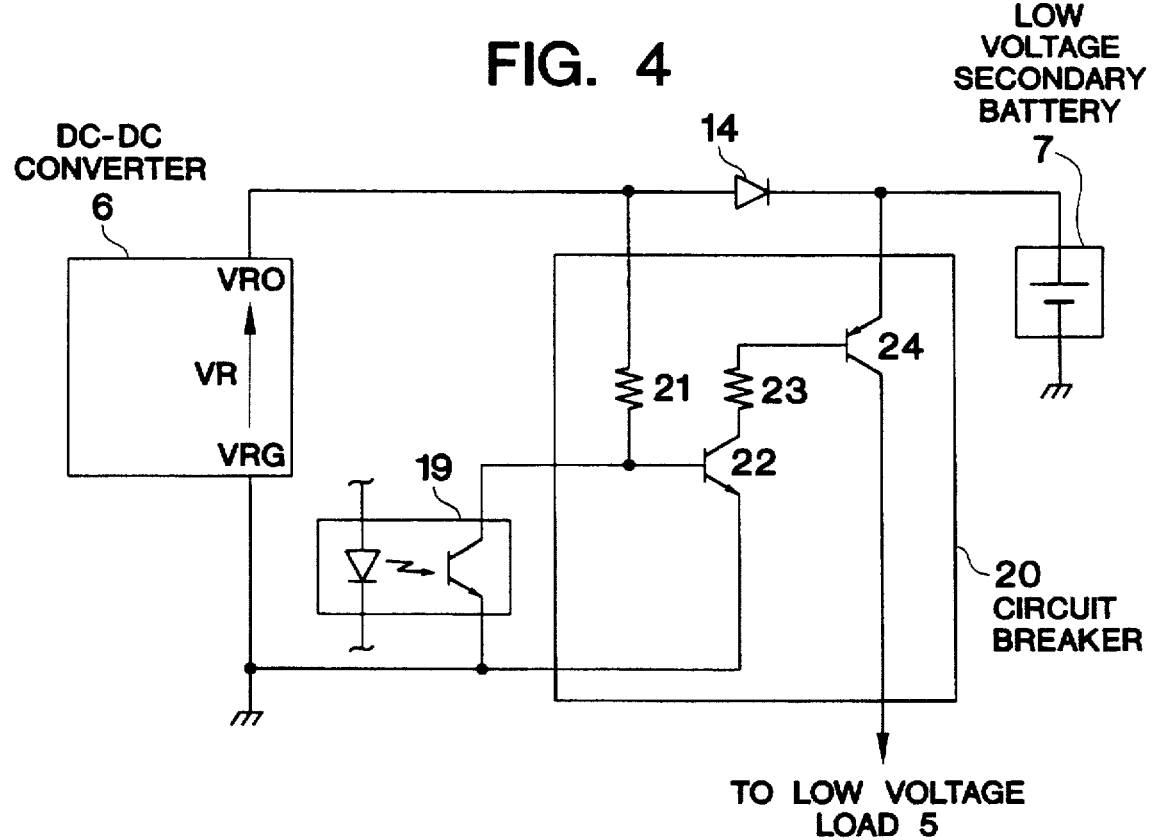
FIG. 4 is a circuit diagram showing a circuit breaking means different from that shown in FIG. 1.

FIG. 4 is a circuit diagram showing another example of the circuit breaking element. A circuit breaking element 20 shown in FIG. 4 uses semiconductor switching elements such as transistors in place of the relay. When the low voltage power VR is outputted from the DC—DC convertor 6, a base current is supplied to an NPN type transistor 22 through a base resistor 21, to turn on the NPN type transistor 22, and it also flows in a PNP type transistor 24 through a base resistor 23, to turn on the PNP type transistor 24, thus supplying power to the low voltage load 5. On the other hand, when a phototransistor constituting a charging state information transmitting circuit 19 is turned on, the base-emitter of the NPN type transistor 22 is short-circuited, to turn off the transistors 22 and 24, thus stopping the supply of power to the low voltage load 5. The charging of the low voltage secondary battery 7 by the output of the low voltage power from the DC—DC convertor 6 can be effectively performed by stopping the supply of power to the low voltage load 5 in the charging state.

Figure 5:
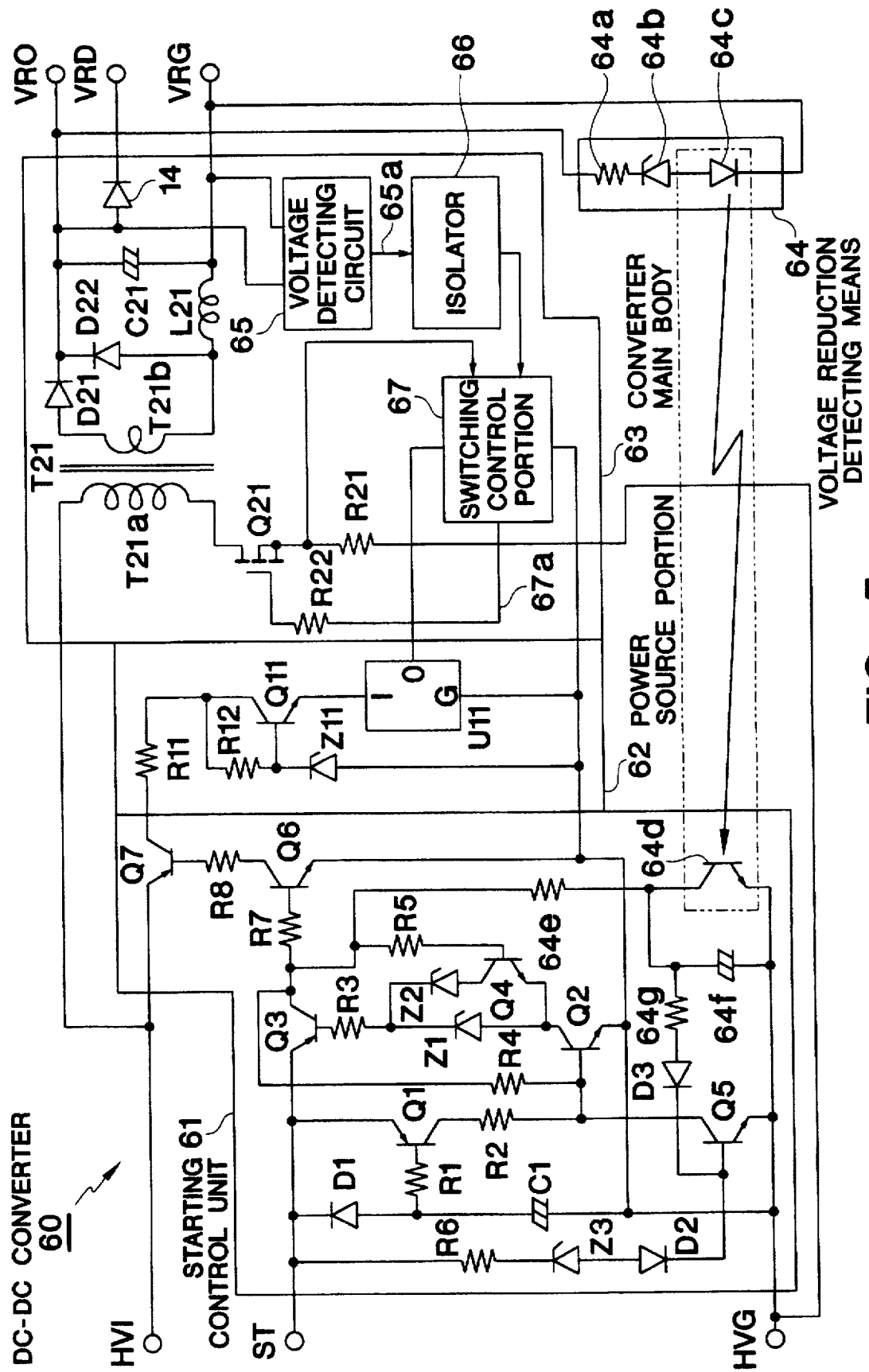
FIG. 5 is a circuit diagram showing a DC—DC convertor different from that shown in FIG. 1.
Figure 6:
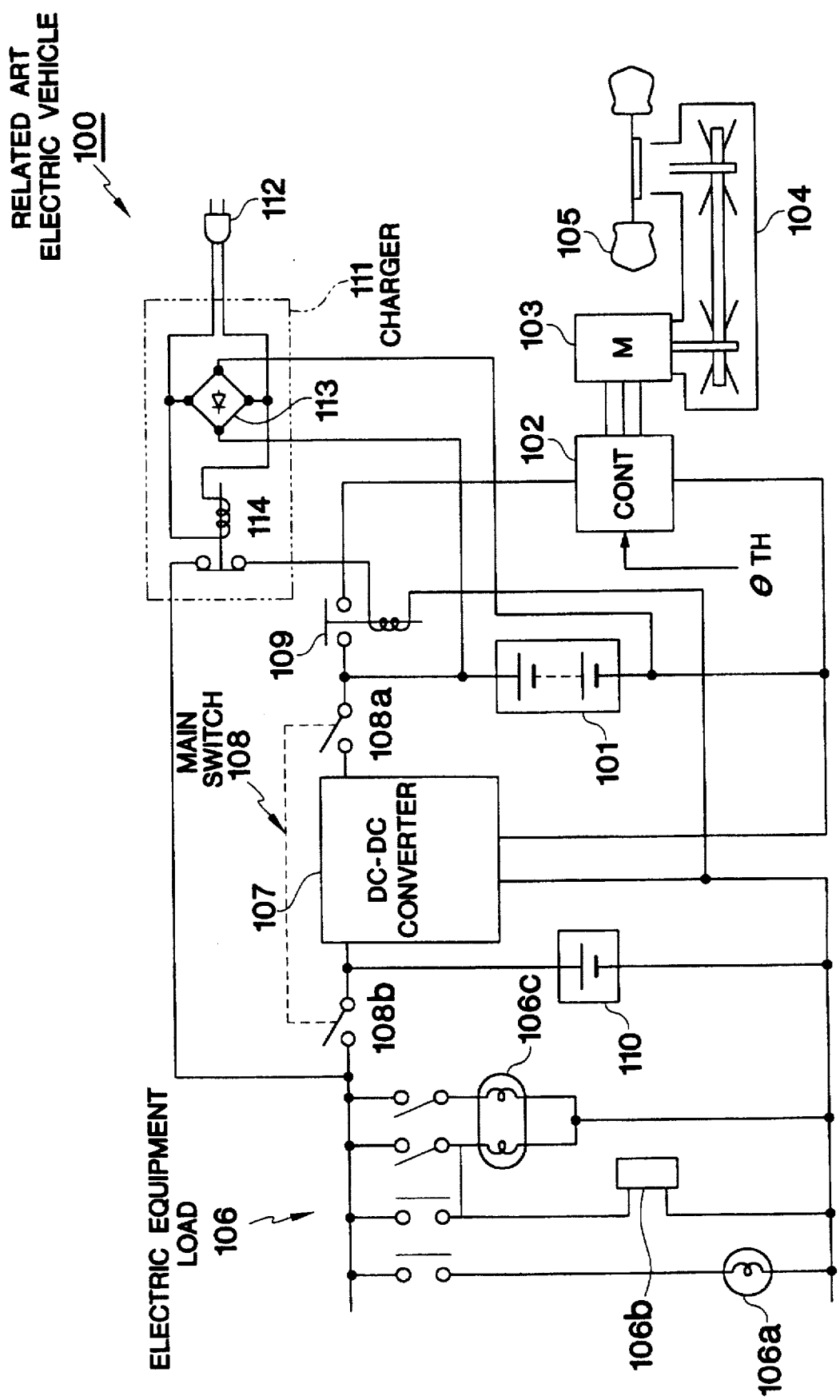
FIG. 6 is a block diagram of a related art electric vehicle.

FIG. 5 is a circuit diagram showing another example of the DC—DC convertor. A DC—DC convertor 60 shown in FIG. 5 contains the counterflow preventive diode 14 and includes an output terminal VRD connected to the counterflow preventive diode 14. The DC—DC convertor 60 includes a starting control unit 61, a power source portion 62, a convertor main body 63, and a voltage reduction detecting element 64.

When a starting power, for example, 12 V, is supplied to a starting control input terminal ST, a base current is supplied to a starting transistor, PNP type transistor Q1, by way of an emitter-base, resistor R1 and capacitor C1 during a time constant set by the resistor R1 and capacitor C1. The starting transistor Q1 is turned on when the base current is supplied, and the base current is supplied to an NPN type transistor Q2 through a resistor R2. A diode D1 is provided for releasing charges of the capacitor C1 when the supply of the starting power is stopped. A constant voltage diode Z1 is of a type in which a breakdown voltage is, for example, about 9 V. When a voltage supplied to the starting control input terminal ST is, for example, 10 V or more, a base current flows in a PNP type transistor Q3 through a base resistor R3, the constant voltage diode Z1 and the NPN type transistor Q2, and thereby the PNP type transistor Q3 is turned on.

When the PNP type transistor Q3 is turned on, the NPN type transistor Q2 and PNP transistor Q3 are kept in the on-state even when the starting transistor Q1 is turned off because a base current is supplied from the collector side of the PNP type transistor Q3 to the NPN type transistor Q2 through a feedback resistor R4. When the PNP type transistor Q3 is turned on, a base current is supplied to an NPN type transistor Q4 through a base resistor R5 and thereby the NPN type transistor Q4 is turned on and is connected to a constant voltage diode Z2. The breakdown voltage of the constant voltage diode Z2 is set at, for example, about 6 V. Accordingly, after the PNP type transistor Q3 is turned on, the NPN type transistor Q2 and PNP type transistor Q3 are kept in the on-state even when a voltage supplied to the starting control input terminal ST is reduced, for example, to about 7 V.

When a voltage, for example, 15 V or more, higher than a rated voltage is supplied to the starting control input terminal ST, a base current flows in a NPN type transistor Q5 provided for stopping the starting operation, through a current limiting resistor R6, a constant voltage diode Z3 for detecting over-voltage upon starting control, and a counterflow preventive diode D2, and thereby the NPN type transistor Q5 is turned on, to short-circuit the base-emitter of the NPN type transistor Q2 provided for driving the starting operation, thereby preventing the drive of the starting operation.

When the PNP type transistor Q3 is turned on, a base current flows through a base resistor R7 in a NPN type transistor Q6 provided for driving a high voltage power source, to thereby turn on the NPN type transistor Q6, and a base current flows in a PNP type transistor Q7 provided for turning on a high voltage power source, through the NPN type transistor Q6. As a result, the PNP type transistor Q7 is turned on, so that a high voltage power, for example, 60 V, of the main battery supplied to the terminal HV1 flows in the power source portion 62.

The power source portion 62 includes a simplified constant voltage circuit having a bleeder resistor R11, an NPN type transistor Q11, a resistor R12, a constant voltage diode Z11; and a regulated power source circuit U11 using a three-terminal regulator IC. A high voltage, for example, 60 V, of the main battery is reduced by the bleeder resistor R11, and is adjusted into, for example, about 20 to 25 V in the simplified constant voltage circuit using the NPN type transistor Q11. The output voltage is further regulated, for example, into about 15 V in the regulated power source circuit U11. The output voltage thus regulated is supplied to a switching control portion 67.

The convertor main body 63 includes a transformer T21; a field effect transistor Q21 for switching power of the main battery supplied to a primary winding T21a of the transformer T21; a current detecting resistor R21; rectifying diodes D21, D22 for rectifying an AC voltage generated at a secondary winding T21b of the transformer T21; a choke coil L21, a smoothing capacitor C21; the counterflow preventive diode 14; an output voltage detecting circuit 65; an isolator 66; and the switching control portion 67.

When a regulated power, for example, about 15 V, is supplied from the power source portion 62, the switching control portion 67 outputs a switching command signal 67a subjected to specified pulse width modulation (PWM) at a predetermined repeated period, switching frequency. The PWM switching command signal 67a is supplied to a gate of the field effect transistor Q21 through a gate resistor R22. The field effect transistor Q21 switches, on the basis of the PWM switching command signal 67a, a current flowing through the primary winding T21a of the transformer T21, to generate an AC voltage corresponding to the winding ratio of the transformer T21 at the secondary winding T21b of the transformer T21. The AC voltage generated at the secondary winding T21b is rectified by the rectifying diodes D21, D22, followed by smoothing by the choke coil L21 and the smoothing capacitor C21, to output a low voltage power VR, low voltage DC voltage, between output terminals VRO and VRG. The low voltage power VR is also outputted between the output terminals VRD and VRG through the counterflow preventive diode 14.

The output voltage detecting circuit 65 detects the output voltage of the low voltage power VR, and produces a signal having a pulse width or pulse period depending on the detected output voltage, or a signal having a pulse width or pulse period depending on a difference (deviation) between a predetermined rated voltage and the output voltage. The pulse signal 65a outputted from the output voltage detecting circuit 65 is transmitted to the switching control portion 67 through the isolator, power separating type signal transmitting circuit, 66 using a photocoupler or the like.

The switching control portion 67 performs a feedback control of the pulse width of the PWM switching command signal 67a so that the output voltage of the low voltage power VR is within a specified voltage, for example, 13.5±1.5 V, on the basis of the information on the output voltage supplied through the isolator 66 or a difference (deviation) between the output voltage and the predetermined rated voltage. The switching control portion 67 monitors whether or not the field effect transistor Q21 is normally operated on the basis of the voltage generated at the end of the current detecting resistor R21; and also adjusts the pulse width of the PWM switching command signal 67a in accordance with the value of the switching current for adjusting the power supplied to the low voltage side through the transformer T21, and controls the current on the primary side so as not to be made excessively large.

The voltage reduction detecting circuit 64 includes a current limiting resistor 64a, a constant voltage diode 64b, and a photodiode 64c of a photocoupler. When a voltage of the low voltage power VR is reduced, for example, to 10 V or less, a current is not allowed to flow in the photodiode 64c and thereby a phototransistor 64d provided on the starting control portion 61 side is turned off. At this time, the charging of a capacitor 64f is started through a resistor 64e, and when the voltage of the capacitor 64f is increased to a specified value, about 1.3 V in this embodiment, a base current flows in the NPN type transistor Q5 provided for stopping the starting operation, by way of a resistor 64g and the counterflow preventive diode D3, and thereby the NPN type transistor Q5 is turned on, thus short-circuiting the base-emitter of the NPN type transistor Q2 for driving the starting operation. As a result, the NPN type transistor Q2 for driving the starting control, PNP type transistor Q3, NPN type transistor Q6 for driving a high voltage power, and PNP type transistor Q7 for turning on a high voltage power are all turned off, to thereby stop the operation of the DC—DC convertor 60.

When a main switch 9 (not shown) is left in the on-state, the main battery 2 is continued to be discharged and thereby the output voltage of the DC—DC convertor 60 is reduced along with a reduction in the voltage of the main battery 2, and consequently the operation of the DC—DC convertor 60 is stopped. In such a state, although the main switch 9 is in the on-state and a voltage is applied to the starting control input terminal ST, the power consumption on the starting control input terminal ST side is not generated because the starting transistor Q1 is in the off-state. In addition, since the starting circuit is constructed so as to be on rated when a voltage is newly applied to the starting control input terminal ST, the DC—DC convertor 60 can be started by turning off the main switch once and then turning on it again.

FIG. 5 shows the configuration in which the starting operation of the starting control portion 61 is stopped on the basis of the reduction in the output voltage of the DC—DC convertor main body 63. However, the switching control portion 67 may have a function of stopping the operation of the DC—DC convertor 60.

Specifically, even when the pulse width of the PWM switching command signal 67a is subjected to feedback control so that the output voltage of the low voltage power VR is set at a value in a specified range, for example, 13.5±1.5 V, on the basis of information on the output voltage supplied through the isolator or a difference (deviation) between the output voltage and the rated voltage, there may occur a state wherein an output voltage out of the specified range is continued for a specified time. In such a state, the battery capacity of the main battery 2 is judged to be reduced, and a pulse signal (not shown) is outputted from the switching control portion 67 for allowing a base current to flow in the NPN type transistor Q5 provided for stopping the starting operation, thereby stopping the operation of the DC—DC convertor. Moreover, the main battery 2 voltage supplied to the power source portion 62 through the PNP type transistor Q7 provided for turning on a high voltage power in the starting control unit 61 is monitored by a voltage monitoring circuit (not shown), and when the voltage is for example more than 50 V, the switching control is started. However, when the switching control is started and then a state wherein the voltage is less than 40 V is continued for a specified time, the output of the PWM switching command signal 67a is stopped, to thereby stop the operation of the DC—DC convertor 60.

The counterflow preventive diode 14 shown in FIGS. 1 and 5 is provided for preventing the detection of the output voltage of the DC—DC convertor from being obstructed by the supply of a voltage of the low voltage secondary battery 7 to the DC—DC convertor 5 side. However, it is undesirable to supply the low voltage power VR of the DC—DC convertor 6 to the low voltage load 5 through the counterflow preventive diode 14, because such a circuit configuration causes a power loss due to the counterflow preventive diode 14. To cope with such an inconvenience, the output voltage detecting circuit 65 in the convertor main body 63 may be so constructed that the output voltage of the low voltage power is detected on the basis of a DC voltage obtained by rectifying an AC voltage generated at the secondary winding T21b of the transformer T21 using a different rectifying circuit (not shown), to thereby eliminate the necessity of the provision of the counterflow preventive diode 14 in a power supply passage to the low voltage load 5.

The DC—DC convertor 60 shown in FIG. 5 can be restarted from the inoperative state by turning off the main switch 9 and then turning it on again. Incidentally, the stopping of the operation of the DC—DC convertor 60 is intended to be performed for preventing the main battery 2 from being over-discharged by leaving the main switch 9 in the on-state. It is desirable to recharge reduced battery capacity of the main battery 2 as early as possible. However, since the DC—DC convertor 6 is easily restarted by turning on the main switch 9 again, the driver often does not sufficiently recognize the fact that the battery capacity of the main battery 2 is reduced.

To cope with such an inconvenience, the DC—DC convertor 6 may be constructed so as not to be started by turning on the main switch 9 again but to be started by operating a returning device composed of a switch or the like operated after, for example, opening a hidden cover provided in a location different from an ordinary operating unit or in the operating unit.

As described above, the apparatus of the present invention prevents over-discharge of a battery used for an electric vehicle which includes a DC—DC convertor for receiving power from the main battery and outputting a low voltage power, which is adapted to stop the output of the low voltage power when the output voltage of the low voltage power cannot be kept within a specified voltage range. A circuit breaking element is provided for breaking the supply of power from the low voltage secondary battery to the low voltage load on the basis of stopping of the output of the low voltage power from the DC—DC convertor. This makes it possible to prevent over-discharge of the low voltage secondary battery.

Moreover, since power consumption of the DC—DC convertor is reduced by stopping of the output of the low voltage power from the DC—DC convertor, power consumption of the main battery is reduced, thus preventing over-discharge of the main battery.

In the above apparatus, the circuit breaking element can be composed of a relay driven by the output voltage of the DC—DC convertor in which the supply of power to the low voltage loads is controlled through a normally-open contact of the relay, and accordingly it becomes possible to simplify the configuration of the circuit breaking element.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for preventing over-discharge of batteries used in an electric vehicle, the electric vehicle including a vehicle load normally on during running of the electric vehicle, the apparatus comprising:

a main battery for generating a relatively high voltage;

DC—DC convertor means for converting the relatively high voltage from said main battery to a relatively low voltage and outputting the relatively low voltage to the vehicle load, said DC—DC convertor means disabling output of the relatively low voltage according to a predetermined condition;

a secondary battery receiving the relatively low voltage from said DC—DC convertor means and supplying the vehicle load with power; and circuit breaking means, interposed between said secondary battery and the vehicle load and between said DC—DC convertor means and the vehicle load, for disabling the supply of power to the vehicle load when said DC—DC convertor means disables output of the relatively low voltage, over-discharge of said main battery being prevented by said DC—DC convertor means disabling output of the relatively low voltage, and over-discharge of said secondary battery being prevented by said circuit breaking means disabling the supply of power to the vehicle load.

2. The apparatus of claim 1, wherein said predetermined condition for disabling output of the relatively low voltage from said DC—DC convertor means is when the relatively low voltage output from said DC—DC convertor means falls below a predetermined voltage value.

3. The apparatus of claim 1, wherein said predetermined condition for disabling output of the relatively low voltage from said DC—DC convertor means is when the relatively low voltage from said DC—DC convertor means falls outside a predetermined voltage range for a predetermined time period.

4. The apparatus of claim 1, wherein said circuit breaking means comprises:

a relay having an exciting winding receiving the relatively low voltage from said DC—DC convertor means; and a normally-open contact through which the supply of power to the vehicle load is controlled.

5. The apparatus of claim 1, wherein said circuit breaking means comprises semiconductor switching elements receiving the relatively low voltage from said DC—DC convertor means and controlling the supply of power to the load.

6. The apparatus of claim 1, further comprising a charging circuit connected to a power source and supplying charging power to said main battery.

7. The apparatus of claim 6, further comprising charging state information transmitting means for transmitting charging state information of said secondary battery, for stopping output of the relatively low voltage to the vehicle load and for enabling charging of said secondary battery by said DC—DC convertor means.

8. The apparatus of claim 1, wherein said main battery comprises a plurality of sub-batteries, the apparatus further comprising:

a low withstand voltage switch, interposed between one of said plurality of sub-batteries and said DC—DC convertor means, for selectively supplying a starting control input voltage to said DC—DC convertor means to place said DC—DC convertor means in an operational state and to cause said DC—DC convertor means to convert the relatively high voltage of said main battery into the relatively low voltage.

9. An electric vehicle comprising:

a vehicle load normally on during running of the electric vehicle;

a main battery for generating a relatively high voltage;

a motor drive circuit for converting the relative high voltage from said main battery to AC power;

an electric motor for receiving the AC power from said motor drive circuit to drive the electric vehicle;

DC—DC convertor means for converting the relatively high voltage from said main battery to a relatively low voltage and outputting the relatively low voltage to the vehicle load, said DC—DC convertor disabling output of the relatively low voltage according to a predetermined condition;

a secondary battery for receiving the relatively low voltage from said DC—DC convertor means and supplying the vehicle load with power; and circuit breaking means, interposed between said secondary battery and the vehicle load and between said DC—DC convertor means and the vehicle load, for disabling the supply of power to the vehicle load when said DC—DC convertor means disables output of the relatively low voltage.

10. The electric vehicle of claim 9, wherein said predetermined condition for disabling output of the relatively low voltage from said DC—DC convertor means is when the relatively low voltage output from said DC—DC convertor means falls below a predetermined voltage value.

11. The electric vehicle of claim 9, wherein said predetermined condition for disabling output of the relatively low voltage from said DC—DC convertor means is when the relatively low voltage output from said DC—DC convertor means falls outside a predetermined voltage range for a predetermined time period.

12. The electric vehicle of claim 9, wherein said circuit breaking means comprises:

a relay having an exciting winding receiving the relatively low voltage from said DC—DC convertor means; and a normally-open contact through which the supply of power to the vehicle load is controlled.

13. The electric vehicle of claim 9, said circuit breaking means comprises semiconductor switching elements receiving the relatively low voltage from said DC—DC convertor means and controlling the supply of power to the vehicle load.

14. The electric vehicle of claim 9, further comprising a charging circuit connected to a power source and supplying charging power to said main battery.

15. The electric vehicle of claim 14, further comprising charging state information transmitting means for transmitting charging state information of said secondary battery, for stopping output of the relatively low voltage to the vehicle load and for enabling charging of said secondary battery by said DC—DC convertor means.

16. The electric vehicle of claim 9, wherein said main battery comprises a plurality of sub-batteries, the electric vehicle further comprising:

a low withstand voltage switch, interposed between one of said plurality of sub-batteries and said DC—DC convertor means, selectively supplying a starting control input voltage to said DC—DC convertor means to place said DC—DC convertor means in an operational state and to cause said DC—DC convertor means to convert the relatively high voltage of said main battery into the relatively low voltage.

17. A method for preventing over-discharge of batteries used in an electric vehicle, the electric vehicle including a vehicle load which is normally on during running of the electric vehicle, the method comprising the steps of:

a) generating a relatively high voltage;

b) converting the relatively high voltage generated in said step a) into a relatively low voltages;

c) supplying the relatively low voltage to the vehicle load;

d) stopping converting in said step b) to thus disable supply of the relatively low voltage to the vehicle load in said step c) in accordance with a predetermined condition;

e) supplying the relatively low voltage to a secondary battery;

f) supplying the vehicle load with power from the secondary battery; and g) stopping supply in said step f) when supply of the relatively low voltage is disabled in said step d), over-discharge of the main battery being prevented by said step d), and over-discharge of the secondary battery being prevented by said step g).

18. The method of claim 17, wherein the predetermined condition in said step d) is when the relatively low voltage converted in said step b) falls below a predetermined voltage value.

19. The method of claim 17, wherein the predetermined condition in said step d) is when the relatively low voltage converted in said step b) falls outside a predetermined voltage range for a predetermined time period.

20. The apparatus of claim 1, wherein said predetermined condition for disabling output of the relatively low voltage from said DC—DC convertor means is when said DC—DC convertor means determines that the relatively high voltage input thereto falls below a predetermined voltage.

21. The apparatus of claim 9, wherein said predetermined condition for disabling output of the relatively low voltage from said DC—DC convertor means is when said DC—DC convertor means determines that the relatively high voltage input thereto falls below a predetermined voltage.

22. The method of claim 17, wherein the predetermined condition in said step d) is when the relatively high voltage generated in said step a) falls below a predetermined voltage.

* * * * *